US009182721B2

(12) United States Patent
Tay et al.

(10) Patent No.: US 9,182,721 B2
(45) Date of Patent: Nov. 10, 2015

(54) UPDATING A SUPPORTED-SUPPLIES DATABASE OF AN IMAGE FORMING APPARATUS

(75) Inventors: Pei Shan Tay, Singapore (SG); David B. Novak, Corvallis, OR (US); Poh Hock Soh, Singapore (SG)

(73) Assignee: Hewlett-Packard Development Company, L.P., Houston, TX (US)

(*) Notice: Subject to any disclaimer, the term of this patent is extended or adjusted under 35 U.S.C. 154(b) by 154 days.

(21) Appl. No.: 13/697,997

(22) PCT Filed: Jun. 2, 2010

(86) PCT No.: PCT/US2010/037075

§ 371 (c)(1), (2), (4) Date: Nov. 14, 2012

(87) PCT Pub. No.: WO2011/152824

PCT Pub. Date: Dec. 8, 2011

(65) Prior Publication Data

US 2013/0057921 A1 Mar. 7, 2013

(51) Int. Cl.
*G06K 15/00* (2006.01)
*G06F 3/12* (2006.01)
*G03G 15/00* (2006.01)

(52) U.S. Cl.
CPC .............. *G03G 15/553* (2013.01); *G03G 15/55* (2013.01)

(58) Field of Classification Search
None
See application file for complete search history.

(56) References Cited

U.S. PATENT DOCUMENTS

| | | | | |
|---|---|---|---|---|
| 6,975,817 | B2 * | 12/2005 | Rommelmann et al. | 399/24 |
| 6,999,188 | B1 | 2/2006 | Ashe | |
| 7,547,092 | B2 | 6/2009 | Silverbrook | |
| 7,619,763 | B2 | 11/2009 | Gibson | |
| 7,796,286 | B2 * | 9/2010 | Omotani | 358/1.15 |
| 8,248,639 | B2 * | 8/2012 | Fujita et al. | 358/1.15 |
| 2003/0184782 | A1 | 10/2003 | Perkins et al. | |
| 2004/0253011 | A1 * | 12/2004 | Rommelmann et al. | 399/24 |
| 2005/0094203 | A1 | 5/2005 | Rodriguez et al. | |
| 2005/0134892 | A1 | 6/2005 | Goto et al. | |
| 2006/0192993 | A1 * | 8/2006 | Omotani | 358/1.15 |
| 2006/0283933 | A1 * | 12/2006 | Ueda et al. | 235/375 |
| 2008/0010637 | A1 | 1/2008 | Walmsley et al. | |
| 2008/0089729 | A1 * | 4/2008 | Fujita et al. | 400/76 |
| 2009/0180139 | A1 | 7/2009 | Ooba | |

OTHER PUBLICATIONS

International Searching Authority, "Search Report," issued in connection with International Application No. PCT/US2010/037075, mailed on Feb. 23, 2011, 3 pages.

* cited by examiner

*Primary Examiner* — Marcus T Riley
(74) *Attorney, Agent, or Firm* — Hanley Flight & Zimmerman, LLC

(57) ABSTRACT

Example methods, apparatus and articles of manufacture to update a supported-supplies database (110) of an image forming apparatus (105) are disclosed. A disclosed example method includes detecting insertion of an imaging supply (120) into an image forming apparatus (105), interacting with the inserted imaging supply (120) to obtain a supply identifier, the supply identifier representing an additional supported imaging supply for the image forming apparatus (105), and adding the obtained supply identifier to a supported-supplies database (110) of the image forming apparatus (105).

16 Claims, 7 Drawing Sheets

UPDATING A SUPPORTED-SUPPLIES DATABASE OF AN IMAGE FORMING APPARATUS

BACKGROUND

Image forming apparatus such as printers are designed and/or intended to be used with only certain imaging supplies. Example imaging supplies include, but are not limited to, an ink cartridge, a toner cartridge, etc. The list of supported imaging supplies is embedded into the firmware and/or the software of the image forming apparatus. The list of supported imaging supplies may be used and/or accessed by a user of the image forming apparatus to determine or identify which supplies are compatible with the image forming apparatus and/or to order compatible supplies.

DETAILED DESCRIPTION

Figure 1:
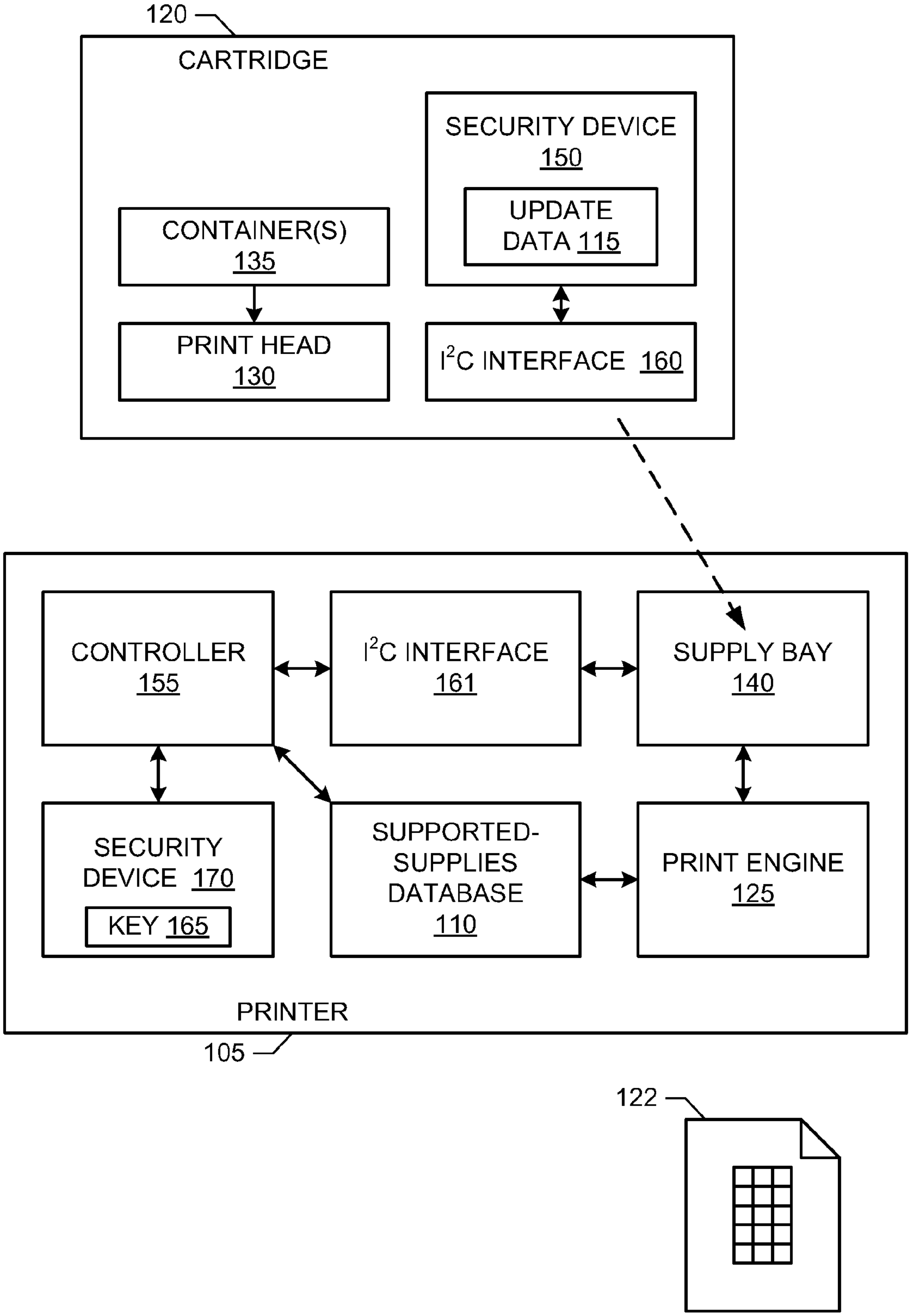
FIG. 1 is a schematic illustration of an example image forming apparatus that is structured to update a supported-supplies database.

Because the list of imaging supplies (e.g., an ink cartridge, a toner cartridge, etc.) supported by an imageforming apparatus (e.g., a printer, an inkjet printer, a dye sublimation printer, a laser printer, a color laser printer, etc.) is traditionally determined, selected and/or fixed during product design, it may be difficult to add, change and/or remove a supported imaging supply late in the product design cycle, during product testing, after product testing, during product release, during market introduction, while a product is being sold, after a product has been sold, and/or after a product has been discontinued. For example, when the list of supported imaging supplies is changed after product testing and/or product validation has been completed, changing the firmware and/or software to add, change and/or remove a supported imaging supply can result in lengthy and/or expensive repetition of product testing. Such delays and/or costs may cause customer frustration, lost sales, delayed product introduction, increased research and development costs, delay the development of other products, and/or result in lost profits.

Example methods, apparatus and articles of manufacture to update supported-supplies databases of image forming apparatus such as printers are disclosed. An example disclosed image forming apparatus implements a dynamic list of supported imaging supplies that are referenced by and/or referred to by the printer's software and/or firmware rather than being embedded into the software and/or firmware. Because the example supported-supplies database is not embedded into the firmware and/or the software of the image forming apparatus, the database can be updated, changed, replaced and/or modified even after the image forming apparatus has been tested, released, sold, distributed or even discontinued. In examples described herein, the supported-supplies database of the imaging forming apparatus is updated based on information, commands and/or data stored in and/or obtained from an update imaging supply. As used herein, the term update imaging supply refers to an imaging supply containing information, commands and/or data that may be accessed by an image forming device and used by the image forming device to update its supported-supplies database. When, for example, an update imaging supply is inserted into the image forming apparatus, the image forming apparatus interacts with the update imaging supply to obtain, access and/or read the supported-supplies update information, data and/or commands stored on the inserted imaging supply, and the imaging forming apparatus updates its supported-supplies database accordingly. The supported-supplies updated information stored in an imaging supply can, for example, indicate that one or more supplies are to be added (possibly including the inserted imaging supply itself) to the supported-supplies data, that one or more supplies are to be removed (possibly including the inserted imaging supply itself) from the supported-supplies data, and/or that all or a portion of the supported-supplies database is to be replaced.

A disclosed example method to update a supported-supplies database of an image forming apparatus includes detecting insertion of an imaging supply into the image forming apparatus, interacting with the inserted imaging supply to obtain a supply identifier, the supply identifier representing an additional supported imaging supply for the image forming apparatus, and adding the obtained supply identifier to the supported-supplies database of the image forming apparatus A disclosed example apparatus to update a supported-supplies database of an image forming apparatus includes a communication module to detect insertion of an imaging supply into the image forming apparatus, a security module to interact with the inserted imaging supply to obtain a supply identifier via the communication module, the supply identifier representing an imaging supply for the image forming apparatus and an action identifier associated with the imaging supply, and a database update module to add the obtained supply identifier to the supported-supplies database of the image forming apparatus or remove the identifier from the database based on the action identifier.

FIG. 1 illustrates an example image forming apparatus 105 that is structured, configured, and/or programmed to update a supported-supplies database 110 based on supported-supplies updated data 115 stored in, obtained from and/or provided by an update imaging supply 120. The supported-supplies database 110 stores, includes and/or contains a list of imaging supplies supported by and/or compatible with the example printer 105. The list of supported imaging supplies may be used and/or accessed by a user of the image forming apparatus to determine or identify which supplies are compatible with the image forming apparatus and/or to order compatible supplies. In some examples, the user may use one or more buttons and/or displays (not shown) of the printer 105 to print a list of supported imaging supplies for reference while purchasing imaging supplies. Additionally or alternatively, the user may access the list of supported imaging supplies using a computer (not shown) communicatively coupled to the printer 105. For example, the computer may access the list of supported supplies via a web-based interface implemented by the printer 105, and/or the computer may access the list of supported supplies via a software driver installed on the computer. Further still, the user may use one or more buttons and/or displays of the printer 105 to access an online order system at the printer 105 to order supported imaging supplies.

The example image forming apparatus 105 of FIG. 1 may be a printer (e.g., an inkjet printer, a dye sublimation printer, a laser printer, a color laser printer, etc.) and/or any other additional and/or alternative device capable of forming an image on any type(s) of media 122. The example update imaging supply 120 may be an ink cartridge, a toner cartridge, a tank, a container and/or any other additional and/or alternative device that supplies a material (e.g., an ink, a dye, a toner, etc.) useable by the example printer 105 and/or the imaging supply 120 to form an image on the media 122. As described below, the example imaging supply 120 of FIG. 1 is structured, configured and/or programmed to communicate with at least one component of the example image forming apparatus 105. For ease of discussion, the following descriptions will focus on an example in which the image forming apparatus 105 is implemented by a printer and the update supply 120 is implemented by an update cartridge. The example image forming apparatus 105 of FIG. 1 will hereafter be referred to as the printer 105, and the example imaging supply 120 will hereafter be referred to as the update cartridge 120. As used herein, the term update cartridge refers to a cartridge containing information, commands and/or data that may be accessed by an image forming apparatus and used by the image forming device to update its supported-supplies database.

To print images, the example printer 105 of FIG. 1 includes a print engine 125 and the example update cartridge 120 of FIG. 1 includes any number and/or type(s) of print heads (one of which is designated at reference numeral 130) and any number and/or type(s) of containers (one of which is designated at reference numeral 135). The example update cartridge 120 of FIG. 1 is insertable into a slot, carrier, receptacle, holder and/or supply bay 140 of the example printer 105. The example supply bay 140 of FIG. 1 communicatively couples the example print engine 125 to the example print head 130, and physically positions and/or moves the example print head 130 relative to print media 122. For example, the supply bay 140 may include any number and/or type(s) of connectors and/or conductors (not shown) that electrically and/or communicatively couple the print engine 125 to the print head 130. The example supply bay 140 also communicatively couples a security device 150 of the update cartridge 120 to a controller 155 of the printer 105 via respective inter-integrated circuit ($I^2C$) interfaces 160 and 161.

Using any number and/or type(s) of message(s), command(s), method(s), logic, protocol(s), signal(s) and/or process(es), the example print engine 125 of FIG. 1 communicates with the example print head 130 to control the application of one or more ink(s), dye(s), liquid(s), toner(s) and/or any other material(s) contained in the example container(s) 135 onto the media 122 to form text and/or images on the media 122. The example print head 130 of FIG. 1 applies the one or more ink(s), dye(s), liquid(s), toner(s) and/or any other material(s) contained in the example container 135 onto the media 122 using any number and/or type(s) of process(es), method(s), and/or printing pass(es).

While a single update cartridge 120 and a single bay 140 are shown in FIG. 1, the example printer 105 may include more than one bay 140 to allow the printer 105 to form text and/or images on the media 122 using more than one update cartridge 120. When more than one bay 140 is present, associated cartridges 120 may operate simultaneously and/or sequentially. When forming some example images on the media 122 only a subset of the cartridges 120 need be used. For example, a black and white image may be formed using only a black ink update cartridge 120, leaving any color ink cartridges 120 inactive. Further, while the example update cartridge 120 of FIG. 1 includes the example print head 130, one or more print heads may alternatively be implemented by and/or within the printer 105.

To manage the supported-supplies database 110, the example printer 105 of FIG. 1 includes the example controller 155. The example controller 155 of FIG. 1 detects installed cartridge(s) and interacts with installed cartridge(s) (e.g., the example update cartridge 120) to determine whether an installed update cartridge 120 includes, contains and/or can provide supported-supplies database update data (e.g., the example update data 115). When supported-supplies database update data 115 is available, the example controller 155 obtains and/or receives the data 115 from the installed update cartridge 120 and updates the supported-supplies database 110 based on the obtained data 115. The example controller 155 of FIG. 1 may also implement any number and/or type(s) of other functions and/or features related to other aspects of the example printer 105 such as, initialization, maintenance and/or configuration. An example data structure that may be used to implement the example update data 115 of FIG. 1 is described below in connection with FIG. 3. An example manner of implementing the example controller 155 is described below in connection with FIG. 4. Example processes that may be carried out by the example controller 155 to update the example supported-supplies database 110 are described below in connection with FIGS. 5-7.

In the illustrated example of FIG. 1, the example supported-supplies database update data 115 is securely stored by and/or within the example security device 150. The example security device 150 may be any number and/or type(s) of security device capable to securely store the update data 115 and to authenticate the security device 150 and/or the update cartridge 120 containing the security device 150 to the example printer 105. In the example of FIG. 1, the controller 155 and the security device 150 implement and/or carry out any number and/or type(s) of security and/or authentication protocol(s) and/or message(s) that allow the controller 155 to authenticate the identity of the security device 150 and/or the update data 115, and/or for the security device 150 to authenticate the identity of the controller 155 and/or the printer 105 prior to providing the update data 115 to the printer 105. In the example of FIG. 1, the controller 155 and the security device 150 implement a two-trip authentication protocol based on an authentication key 165 securely stored in a security device 170 of the printer 105. While the illustrated example of FIG. 1 employs authentication and secure data storage to prevent unauthorized access to the update data 115 and/or to ensure the update data 115 has not been tampered with, a supported-supplies database 110 of an image forming apparatus 105 may be updated without authentication and/or secure data storage, obviating the need for the example security device 150 and the security device 170 (e.g., the update data 115 can be stored in an unsecured memory).

To communicatively couple the example controller 155 to the example security device 150, the example update cartridge 120 of FIG. 1 includes the example $I^2C$ interface 160, and the example printer 105 of FIG. 1 includes the example $I^2C$ interface 161. The example $I^2C$ interfaces 160 and 161 of FIG. 1 implement and/or form a communication bus, protocol and/or path over one or more electrical connections formed between the printer 105 and the update cartridge 120 when the update cartridge 120 is inserted into the supply bay 140. Via the communication bus, protocol and/or path implemented by the example $I^2C$ interfaces 160 and 161, the example controller 155 can authenticate the security device 150, and/or obtain and/or read the update data 115. In some examples, the print engine 125 and/or the controller 155 interact with the print head 130 via the $I^2C$ interfaces 160 and 161. Additionally or alternatively, the print engine 125 and/or the controller 155 interact with the print head 130 via other electrical connections formed when the update cartridge 120 is inserted into the supply bay 140. While $I^2C$ interfaces 160 and 161 are depicted in FIG. 1, any number and/or type(s) of additional and/or alternatively communication interface(s), device(s), module(s) and/or protocol(s) may be used to communicatively couple the controller 155 to the security device 150.

While the example update cartridge 120 of FIG. 1 includes the example security device 150 and the example supported-supplies database update data 115, another cartridge supported by the printer 120 need not include the security device 150 and/or supported-supplies database update data 115. For example, only special-purpose update cartridges 120 may include the example security device 150 and the example supported-supplies database update data 115. These special-purpose updated cartridges 120 could be manufactured and/or sold (e.g., at a premium relative to cartridges that are no special purpose, given to high-volume and/or high-value customers, etc.) to allow users to upgrade their printers 105. Additionally and/or alternatively, a manufacture could include the example security device 150 and the example supported-supplies database update data 115 in one or more update cartridges 120 to enable automatic updates of supported-supplies databases 110 prior to, for example, the introduction of a new cartridge type and/or the discontinuation of a cartridge type. In some examples, supported-supplies database updates occur without user knowledge and/or user interaction. In other examples, a user of the printer 105 needs to confirm, allow and/or acknowledge the update(s) (e.g., using one or more buttons of the printer 105 and/or via a user interface implemented by a computer communicatively coupled to the printer 105) prior to the update(s) being applied. In some examples, a user may need to provide a security and/or access key and/or identifier prior to the supported-supplies database 110 being updated. Additionally or alternatively, if the example supported-supplies database 110 cannot and/or was not properly updated, the controller 155 may provide an error indication via, for example, a light-emitting diode and/or a display implemented by the printer 105 (not shown), and/or via a user interface presented on a computer communicatively coupled to the printer 105.

The example supported-supplies database 110 of FIG. 1 may be implemented using any number and/or type(s) of data structure(s). An example data structure that may be used to implement the example supported-supplies database 110 is described below in connection with FIG. 2. The example supported-supplies database 110 may be stored in any number and/or type(s) of memory(-ies), memory device(s), storage device(s) and/or any other tangible computer-readable medium. In some examples, the supported-supplies database 110 is stored in secured (e.g., cryptographically secure) non-volatile memory implemented by and/or as a part of the example security device 170 and/or elsewhere within the printer 105.

While an example printer 105 and an example update cartridge 120 have been illustrated in FIG. 1 one or more of the interfaces, data structures, elements, processes and/or devices illustrated in FIG. 1 may be combined, divided, re-arranged, omitted, eliminated and/or implemented in any other way. For example, the security devices 150 and 170 may be omitted. Further, the example supported-supplies database 110, the example update data 115, the example print engine 125, the example print head 130, the example container 135, the example supply bay 140, the example security device 150, the example controller 155, the example $I^2C$ interfaces 160 and 161, the example security device 170 and/or, more generally, the example printer 105 and the example update cartridge 120 of FIG. 1 may be implemented by hardware, software, firmware and/or any combination of hardware, software and/or firmware. Thus, for example, any of the example supported-supplies database 110, the example update data 115, the example print engine 125, the example print head 130, the example container 135, the example supply bay 140, the example security device 150, the example controller 155, the example $I^2C$ interfaces 160 and 161, the example security device 170 and/or, more generally, the example printer 105 and the example update cartridge 120 may be implemented by the example process platform P100 of FIG. 8 and/or one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), fuses, etc. When any apparatus claim of this patent incorporating one or more of these elements is read to cover a purely software and/or firmware implementation, at least one of the example supported-supplies database 110, the example update data 115, the example print engine 125, the example print head 130, the example container 135, the example supply bay 140, the example security device 150, the example controller 155, the example $I^2C$ interfaces 160 and 161, the example security device 170 and/or, more generally, the example printer 105 and the example update cartridge 120 is hereby expressly defined to include a tangible article of manufacture such as a tangible computer-readable medium storing the firmware and/or software. As used herein, the term tangible computer-readable medium is expressly defined to include any type of computer-readable medium and to expressly exclude propagating signals. As used herein, the term non-transitory computer-readable medium is expressly defined to include any type of computer-readable medium and to exclude propagating signals. Example tangible and/or non-transitory computer-readable medium include a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 8. Further still, the example printer 105 and/or the example update cartridge 120 may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
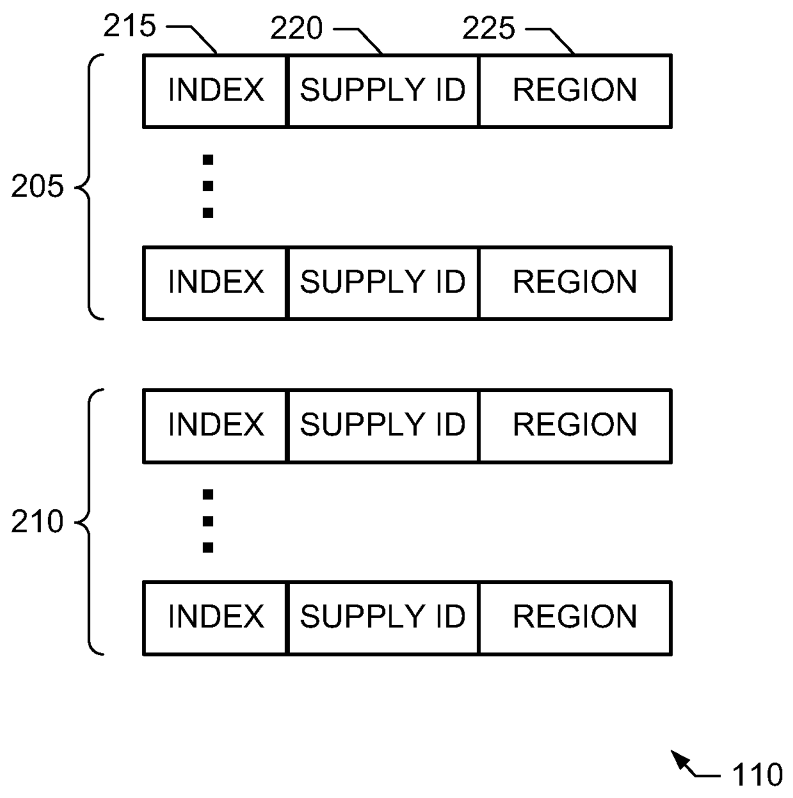
FIG. 2 illustrates an example data structure that may be used to implement the example supported-supplies database of FIG. 1.

FIG. 2 illustrates an example data structure that may be used to implement the example supported-supplies database 110 of FIG. 1. The example data structure of FIG. 2 includes one or more tables (two of which are designated at reference numerals 205 and 210). In the illustrated example of FIG. 2, the first table 205 is used to store a first list of cartridges 120 associated with printing black and/or gray, and the second table 210 is used to store a second list of cartridges 120 associated with printing colors. Each of the example tables 205 and 210 of FIG. 2 include a plurality of entries for respective ones of a plurality of supported cartridges 120.

To order the supported cartridges 120 within the example tables 205 and 210, each of the example entries of FIG. 2 includes an index field 215. Each of the example index fields 215 contains a number that represents the position of the entry within the tables 205 and 210. For example, a first entry has an index of 1, a second entry has an index of 2, etc.

To identify cartridges, each of the example entries of FIG. 2 includes a supply identifier field 220. Each of the example supply identifier fields 220 of FIG. 2 contains one or more characters and/or numbers that uniquely identifies a type of imaging supply. In some examples, a supply identifier corresponds to a cartridge identifier printed boldly on packaging to assist users in purchasing appropriate cartridges. Additionally or alternatively, a supply identifier may represent a part number and/or UPC code.

To identify regions, each of the example entries of FIG. 2 includes a region field 225. Each of the example region fields 225 of FIG. 2 contains one or more characters and/or numbers that uniquely identify a particular geographic and/or marketing region. Values stored in the example region fields 225 may be used to assist in the selection of cartridges for use with printers sold in, for example, particular geographic and/or marketing regions.

Figure 3:
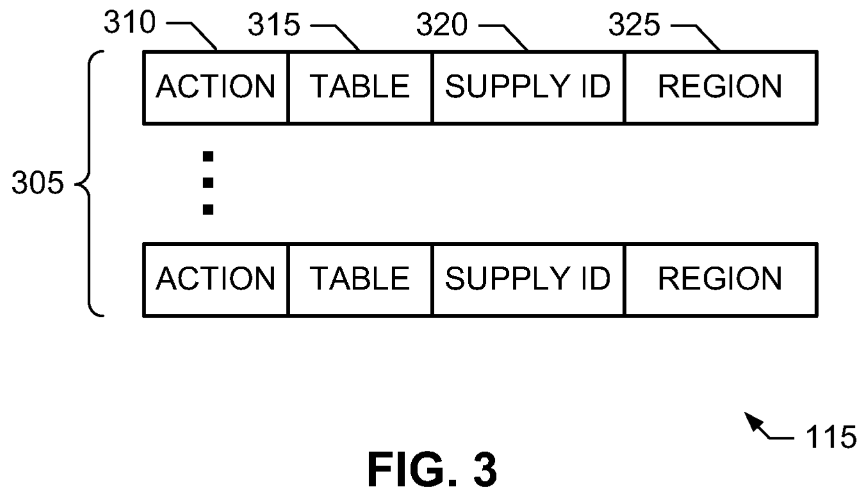
FIG. 3 illustrates an example data structure that may be used to implement the example supported-supplies database update data of FIG. 1.

FIG. 3 illustrates an example data structure that may be used to implement the example update data 115 of FIG. 1. The example data structure of FIG. 3 includes a plurality of entries 305 for respective ones of a plurality of changes to the example supported-supplies database 110. To identify an action, each of the example entries 305 of FIG. 3 includes an action field 310. Each of the example action fields 310 of FIG. 3 contains a value corresponding to a particular action. Example actions include, but are not limited to, add cartridge, remove cartridge, and replace cartridge.

To identify a table to which the action 310 applies (e.g., which of the example tables 205 and 210 of FIG. 2), each of the example entries 305 of FIG. 3 includes a table field 315. Each of the example table fields 315 of FIG. 3 contains one or more numbers and/or characters identifying one or more tables of the example supported-supplies database 110. For example, a first value may correspond to the example black table 205 of FIG. 2 and a second value may correspond to the example color table 210.

To identify cartridges, each of the example entries 305 of FIG. 3 includes a supply identifier field 320. Each of the example supply identifier fields 320 of FIG. 3 contains one or more characters and/or numbers that uniquely identifies a type of imaging supply. In some examples, a supply identifier corresponds to a cartridge identifier printed boldly on packaging to assist users in purchasing appropriate cartridges. Additionally or alternatively, a supply identifier may represent a part number and/or UPC code.

To identify regions, each of the example entries 305 of FIG. 3 includes a region field 325. Each of the example region fields 325 of FIG. 3 contains one or more characters and/or numbers that uniquely identify a particular geographic and/or marketing region. Values stored in the example region fields 325 may be used to assist in the selection of cartridges for use with printers sold in, for example, particular geographic and/or marketing regions.

While example data structures that may be used to implement the example supported-supplies database 110 and/or the example supported-supplies database update data 115 of FIG. 1 are illustrated in FIGS. 2 and 3, respectively, the supported-supplies database 110 and/or the supported-supplies database update data 115 may be implemented using any number and/or type(s) of other and/or additional fields and/or data. Further, the fields and/or data illustrated in FIGS. 2 and/or 3 may be combined, divided, re-arranged, eliminated and/or implemented in any way. Moreover, the example data structures may include fields and/or data in addition to, or instead of, those illustrated in FIGS. 2 and 3, and/or may include more than one of any or all of the illustrated fields and/or data.

Figure 4:
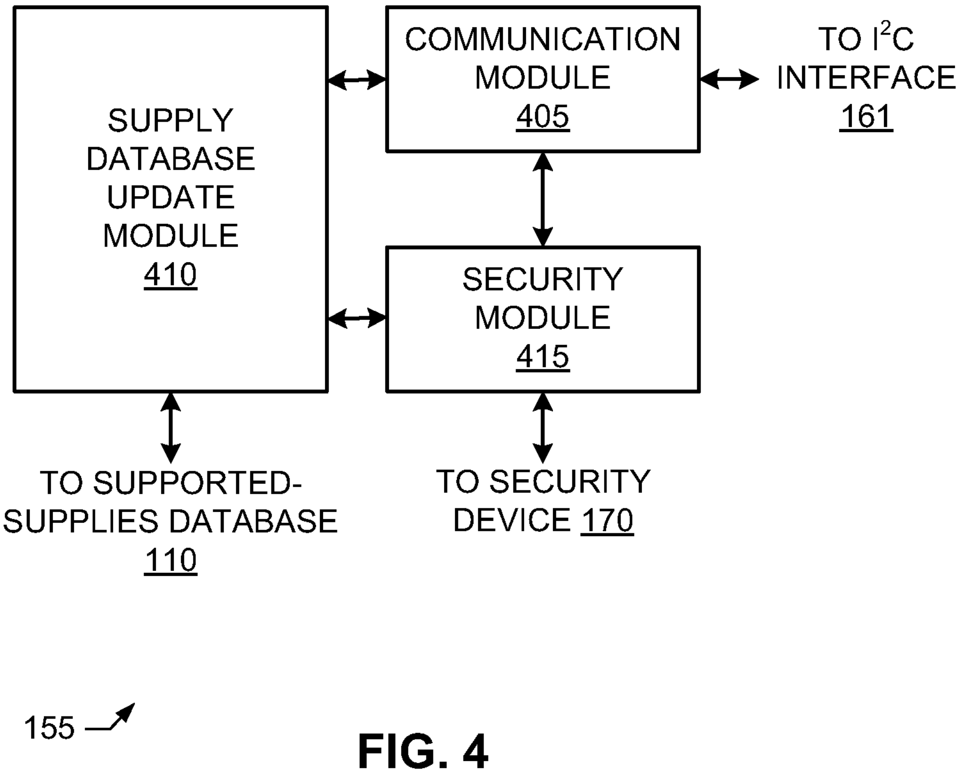
FIG. 4 illustrates an example manner of implementing the example controller of FIG. 1

FIG. 4 illustrates an example manner of implementing the example controller 155 of FIG. 1. To communicate with the example security device 150, the example controller 155 of FIG. 4 includes any type of communication module 405. The example communication module 405 of FIG. 4 implements any number and/or type(s) of communication protocol(s), message(s) and/or application programming interface(s) to enable a supply database update module 410 to interact with the example security device 150 of the update cartridge 120 to request, obtain and/or receive the example update data 115.

To authenticate the example security device 150 of the update cartridge 120, the example controller 155 of FIG. 4 includes any type of security module 415. Using any number and/or type(s) of security protocol(s), key(s) 165, and/or encryption technique(s), the example security module 415 of FIG. 4 authenticates the identity of the example security device 150 and/or the authenticity of received supported-supplies update data 115 to secure communications between the update module 410 and the example security device 150.

To update the example supported-supplies database 110 of FIG. 1 based on update data 115 received from the security device 150 via the communication module 405 and the $I^2C$ interface 161, the example controller 155 of FIG. 4 includes the example supply database update module 410. When the example supply database update module 410 of FIG. 4 receives update data 115 from an inserted update cartridge 120, the update module 410 processes each entry 305 (FIG. 3) of the received update data 115. For each entry 305, the update module 410 updates the table(s) 205, 210 identified in the table field 315 according to the action identified in the action field 310. For example, if a update cartridge 120 is to be added, the update module 410 identifies where in the table(s) 205, 210 the additional update cartridge 120 is to be added, moves any entries located below the identified insertion location downward (adjusting their index fields 215 accordingly) and adds a new entry for the additional update cartridge 120 at the identified location. In some examples, entries in the tables 205 and 210 are ordered based on their supply identifier values 220.

While an example manner of implementing the example controller 155 of FIG. 1 has been illustrated in FIG. 4 one or more of the interfaces, data structures, elements, processes and/or devices illustrated in FIG. 4 may be combined, divided, re-arranged, omitted, eliminated and/or implemented in any other way. For example, the security module 415 may be omitted. Further, the example communication module 405, the example supply database update module 410, the example security module and/or, more generally, the example controller 155 of FIG. 4 may be implemented by hardware, software, firmware and/or any combination of hardware, software and/or firmware. Thus, for example, any of the example communication module 405, the example supply database update module 410, the example security module and/or, more generally, the example controller 155 may be implemented by the example process platform P100 of FIG. 8 and/or one or more circuit(s), programmable processor(s), ASIC(s), PLD(s), FPLD(s), and/or FPGA(s), etc.

When any apparatus claim of this patent incorporating one or more of these elements is read to cover a purely software and/or firmware implementation, at least one of the example communication module 405, the example supply database update module 410, the example security module and/or the example controller 155 are hereby expressly defined to include a tangible article of manufacture such as a tangible computer-readable medium storing the firmware and/or software. Further still, the example controller 155 may include interfaces, data structures, elements, processes and/or devices instead of, or in addition to, those illustrated in FIG. 4 and/or may include more than one of any or all of the illustrated interfaces, data structures, elements, processes and/or devices.

Figure 5:
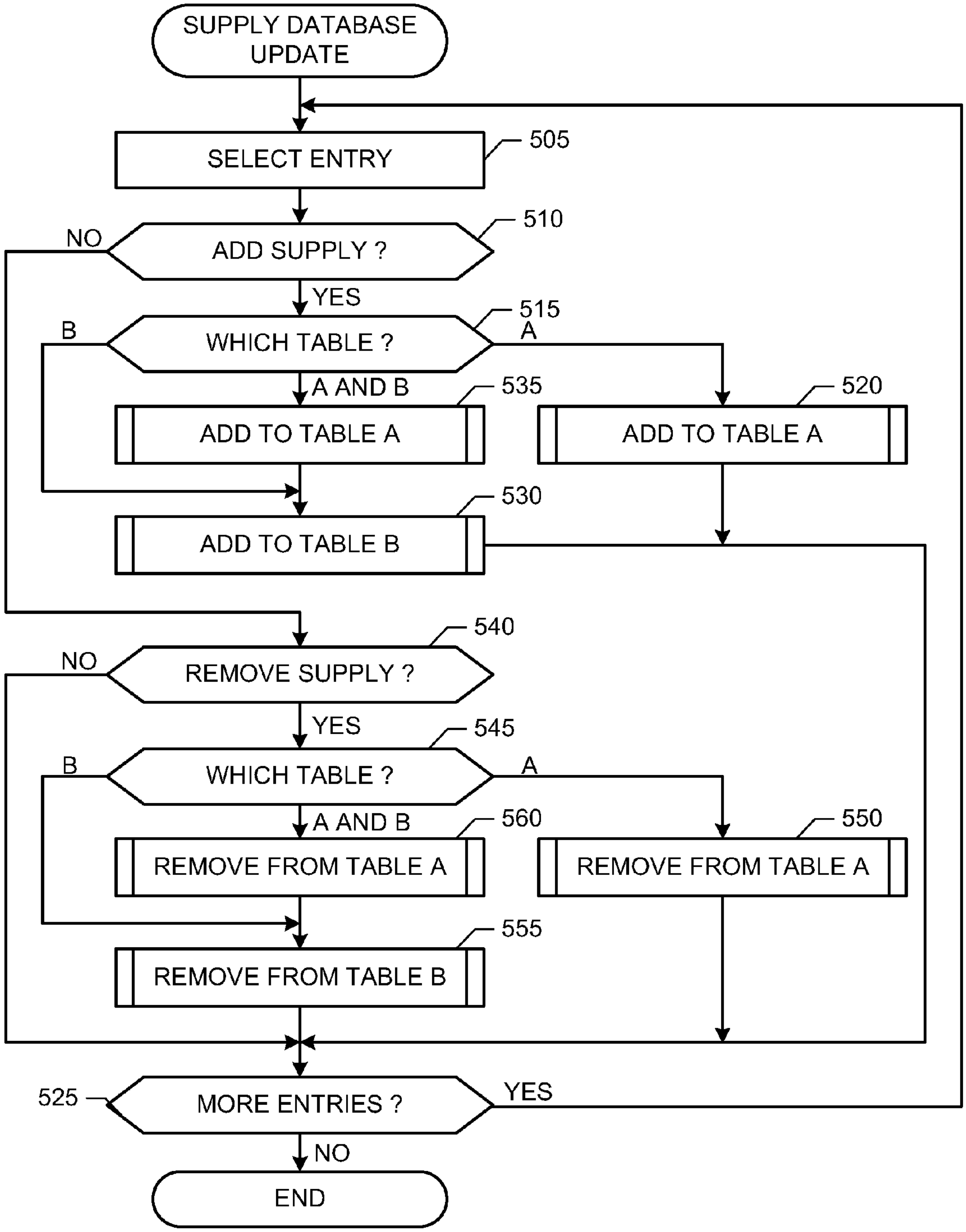
FIGS. 5-7 are representative of example processes that may be implemented as machine-accessible instructions and executed by, for example, one or more processors, to update the example supported-supplies database of FIG. 1.
Figure 6:
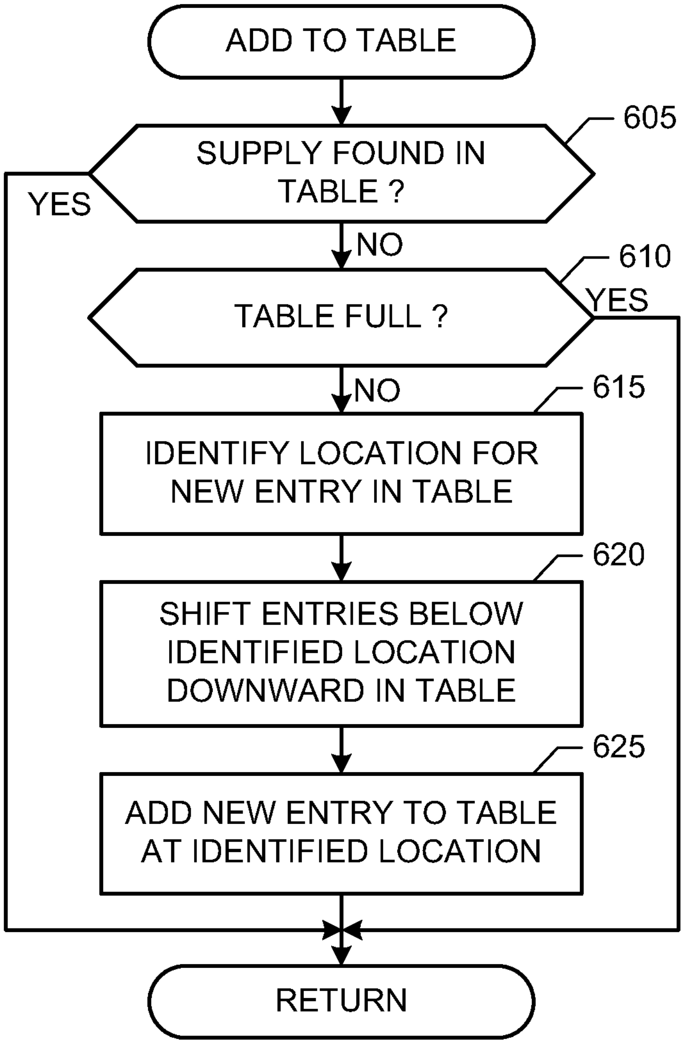
Figure 7:
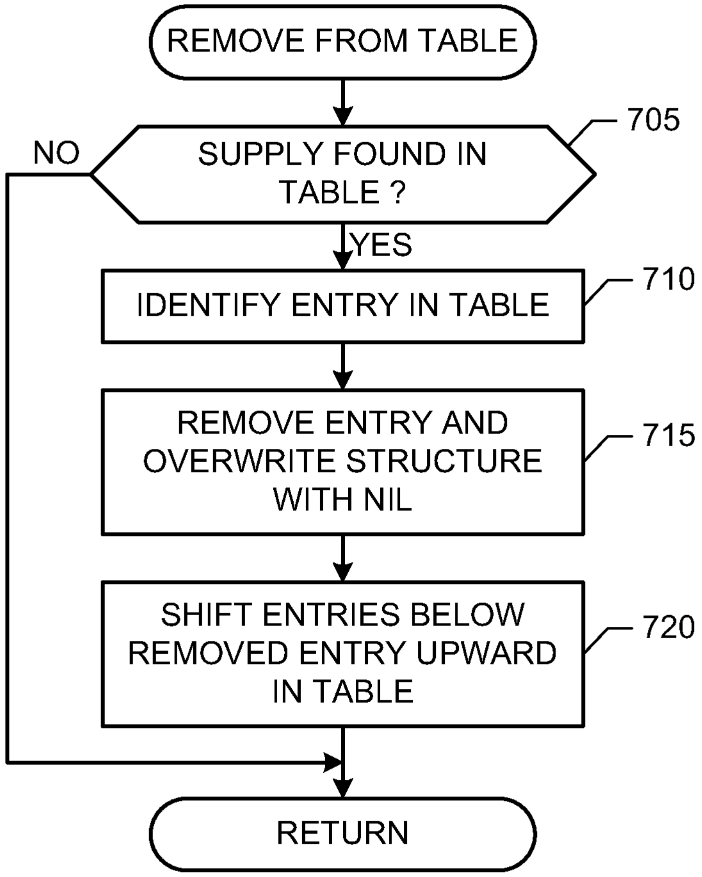

FIGS. 5-7 illustrate example processes that may be carried out and/or embodied in machine-accessible instructions that may be executed to implement the example controller 155 of FIGS. 1 and 4 and/or to update the supported-supplies database 110 of the example printer 105 of FIG. 1. A processor, a controller and/or any other suitable processing device may be used, configured and/or programmed to execute the example machine-accessible instructions represented in FIGS. 5, 6 and/or 7. For example, the machine-accessible instructions of FIGS. 5, 6 and/or 7 may be embodied in coded instructions stored on a tangible computer-readable medium. Machine-readable instructions comprise, for example, instructions that cause a processor, a computer and/or a machine having a processor to perform one or more particular processes. Alternatively, some or all of the example processes of FIGS. 5, 6 and/or 7 may be implemented using any combination(s) of ASIC(s), PLD(s), FPLD(s), FPGA(s), discrete logic, hardware, firmware, etc. Also, some or all of the example processes of FIGS. 5, 6 and/or 7 may be implemented manually or as any combination of any of the foregoing techniques, for example, any combination of firmware, software, discrete logic and/or hardware. Further, many other methods of implementing the example operations of FIGS. 5, 6 and/or 7 may be employed. For example, the order of execution of the blocks may be changed, and/or one or more of the blocks described may be changed, eliminated, sub-divided, or combined. Additionally, the blocks of any or all of the example processes of FIGS. 5, 6 and/or 7 may be carried out sequentially and/or carried out in parallel by, for example, separate processing threads, processors, devices, discrete logic, circuits, etc.

The illustrated example of FIG. 5 begins when the example printer 105 (e.g., the example supported supplies database update module 410) detects insertion of an update cartridge 120 and interacts with the detected updated cartridge 120 to obtain supported-supplies database update data 115 from the update cartridge 120 via the example communication module 405 and the example $I^2C$ interface 161. In some examples, the update data 115 is obtained using one or more authenticated and/or secure communication sessions enabled by the example security module 415, and/or the update data 115 may have been authenticated by the example security module 415. However, the use of authentication and/or secure data storage is not employed in some examples. While the illustrated example of FIG. 5 supports two tables 205, 210 in the example database 110, the example process shown in FIG. 5 may be readily modified to support any number of tables.

The supported supplies database update module 410 selects a first entry 305 of the received update data 115 (block 505). If the action field 315 indicates the supply 320 is to be added (block 510), the update module 410 examines the table field 315 to determine to which table(s) the supply 320 is to be added (block 515).

If the supply 320 is to be added to table A (e.g., the example table 205) (block 515), the supply 320 is added to table A by, for example, executing the example machine-accessible instructions of FIG. 6 (block 520). If there are more entries 305 to be processed (block 525), control returns to block 505 to process the next entry 305. If there are no more entries 305 to process (block 525), control exits from the example machine-accessible instructions of FIG. 5.

Returning to block 515, if the supply 320 is to be added to table B (block 515), the supply 320 is added to table B by, for example, executing the example machine-accessible instructions of FIG. 6 (block 530) and control proceeds to block 525 to determine whether there are more entries 305 to process.

Returning to block 515, if the supply 320 is to be added to table A and to table B (block 515), the supply 320 is added to table A by, for example, executing the example machine-accessible instructions of FIG. 6 (block 535) and added to table B by, for example, again executing the example machine-accessible instructions of FIG. 6 (block 530). Control then proceeds to block 525 to determine whether there are more entries 305 to process.

Returning to block 510, if the supply 320 is not to be added (block 510), the update module 410 determines whether the supply 320 is to be removed (block 540). If the supply 320 is not to be removed (block 540), control proceeds to block 525 to determine whether there are more entries to process. If the supply 320 is to be removed (block 540), the update module 410 examines the table field 315 to determine from which table(s) the supply 320 is to be removed (block 545).

If the supply 320 is to be removed from table A (e.g., the example table 205) (block 545), the supply 320 is removed from table A by, for example, executing the example machine-accessible instructions of FIG. 7 (block 550). If there are more entries 305 to be processed (block 525), control returns to block 505 to process the next entry 305.

Returning to block 545, if the supply 320 is to be removed from table B (block 545), the supply 320 is removed from table B by, for example, executing the example machine-accessible instructions of FIG. 7 (block 555) and control proceeds to block 525 to determine whether there are more entries 305 to process.

Returning to block 545, if the supply 320 is to be removed from table A and from table B (block 545), the supply 320 is removed from table A by, for example, executing the example machine-accessible instructions of FIG. 7 (block 560) and removed from table B by, for example executing the example machine-accessible instructions of FIG. 7 (block 555). Control then proceeds to block 525 to determine whether there are more entries 305 to process.

The example machine-accessible instructions of FIG. 6 may be executed to add an additional update cartridge 120 to a table 205, 210 of the example supported-supplies database 110 of FIG. 1. The example supported-supplies database update module 410 determines whether the supply identified in the supply field 320 is already in the table 205, 210 (block 605). If the supply is already in the table 205, 210 (block 605), control returns from the example machine-accessible instructions of FIG. 6 without making any changes to the table 205, 210.

If the supply is not in the table 205, 210 (block 605), the update module 410 determines whether the table 205, 210 is full (block 610). If the table 205, 210 is full (block 610), control returns from the example machine-accessible instructions of FIG. 6 without making any changes to the table 205, 210.

If the table 205, 210 is not full (block 610), the update module 410 identifies where in the table 205, 210 the supply is to be inserted (block 615). Any entries located at and below the identified location are shifted downward and their indexes 215 are adjusted accordingly (e.g., increased by one) (block 620). A new entry containing the additional supply is added to the table 205, 210 at the identified location (block 625), and control exits from the example machine-accessible instructions of FIG. 6.

The example machine-accessible instructions of FIG. 7 may be executed to remove a update cartridge 120 from a table 205, 210 of the example supported-supplies database 110 of FIG. 1. The example supported-supplies database update module 410 determines whether the supply identified in the supply field 320 is in the table 205, 210 (block 705). If the supply is not in the table 205, 210 (block 705), control returns from the example machine-accessible instructions of FIG. 7 without making any changes to the table 205, 210.

If the supply is in the table 205, 210 (block 705), the update module 410 identifies where in the table 205, 210 the supply is located (block 710). The identified entry is removed and any corresponding data structures are overwritten with nil values (block 715). Any entries located at or below the removed entry are shifted upward in the table 205, 210 and their indexes 215 are adjusted accordingly (e.g., decreased by one) (block 720). Control then exits from the example machine-accessible instructions of FIG. 7.

Figure 8:
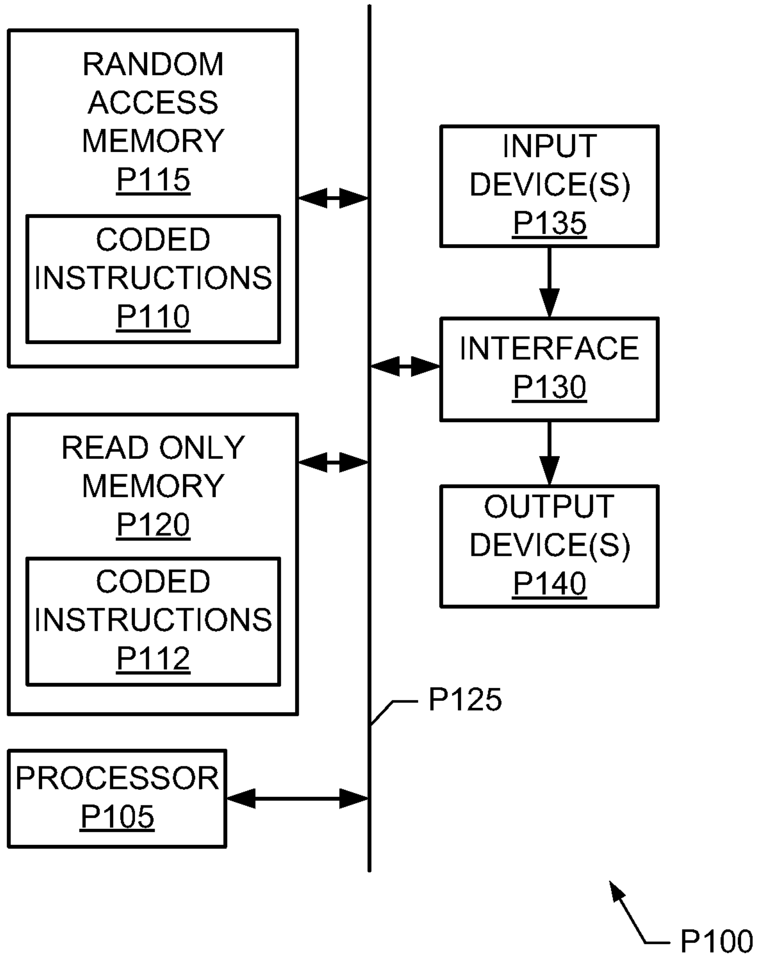
FIG. 8 is a schematic illustration of an example processor platform that may be used and/or programmed to execute the example machine-accessible instructions of FIGS. 5-7 to update the example supported-supplies database of FIG. 1.

FIG. 8 is a schematic diagram of an example processor platform P100 that may be used and/or programmed to execute the machine readable instructions represented by FIGS. 5, 6 and/or 7 to implement the example controller 155 described herein. One or more general-purpose processors, processor cores, microcontrollers, etc may be used to implement the processor platform P100.

The processor platform P100 of the example of FIG. 8 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 5, 6 and/or 7 to update the example supported-supplies database 110 of FIG. 1. Thus, the coded instructions P110, P112 may include the instructions of FIGS. 5, 6 and/or 7.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device. The ROM P120 may be implemented by flash memory and/or any other desired type of memory device. Access to the memory P115 and the memory P120 may be controlled by a memory controller. The example memory P115 may be used to, for example, implement supported-supplies database 110 and/or the supported-supplies database update data 115.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The example input and output devices P135 and P140 may be used, for example, to implement the example $I^2C$ interfaces 160 and 161 of FIG. 1, and/or the example communication module 405 and/or the example security module 415 of FIG. 4.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. A method to update a supported-supplies database of an image forming apparatus, the method comprising:

detecting insertion of a first imaging supply into the image forming apparatus;

obtaining a first supply identifier from the first imaging supply, wherein, prior to the first supply identifier being obtained, the first supply identifier is absent from the supported-supplies database of the imaging forming apparatus, the first supply identifier representing an additional supported imaging supply for the image forming apparatus;

obtaining an action identifier associated with the first supply identifier from the inserted first imaging supply; and dynamically adding the obtained first supply identifier to the supported-supplies database when the action identifier represents a command to add the first supply identifier, the supported-supplies database including one or more supply identifiers corresponding to one or more imaging supplies that are supported by or compatible with the image forming apparatus.

2. A method as defined in claim 1, further including authenticating at least one of the first supply identifier or the inserted first imaging supply.

3. A method as defined in claim 1, further including storing the supported-supplies database in cryptographically secure storage.

4. A method as defined in claim 1, wherein the first supply identifier represents the inserted first imaging supply.

5. An apparatus to update a supported-supplies database of an image forming apparatus, the apparatus comprising:

a communication interface to detect insertion of a first imaging supply into the image forming apparatus;

a security controller to obtain a supply identifier from the first imaging supply, the supply identifier associated with an action identifier, the security controller to interact with the inserted first imaging supply to obtain the action identifier associated with the supply identifier; and a database update controller to dynamically add the supply identifier obtained from the first imaging supply to the supported-supplies database of the image forming apparatus when the action identifier represents a command to add the supply identifier, the database update controller to remove the supply identifier from the supported-supplies database when the action identifier represents a command to remove the supply identifier, the supported-supplies database including supply identifiers respectively corresponding to imaging supplies that are compatible with the image forming apparatus.

6. An apparatus as defined in claim 5, further including a security device to cryptographically store a security identifier associated with the image forming apparatus, the security controller to authenticate at least one of the supply identifier, the first imaging supply, or a second imaging supply based on the security identifier.

7. An apparatus as defined in claim 5, wherein the communication interface includes an inter-integrated circuit interface.

8. An apparatus as defined in claim 5, wherein the first imaging supply includes:

a memory to store a data structure having one or more entries for respective ones of the supply identifiers, the one or more entries including a corresponding action identifier and a corresponding region identifier, a first of the one or more entries to store the supply identifier and the action identifier; and a second interface to communicatively couple the imaging supply to the communication interface, the security controller to obtain the supply identifier from the memory via the second interface.

9. An apparatus as defined in claim 8, wherein the first imaging supply further includes a security device to cryptographically store the supply identifier in the memory, and the security controller is to obtain the supply identifier from the imaging supply via the security device.

10. An article of manufacture comprising machine-readable instructions that, when executed, cause a processor to update a supported-supplies database of an image forming apparatus by at least:

interacting with an inserted first imaging supply to obtain a supply identifier associated with an action identifier; and action identifier at least one of adding the supply identifier to the supported-supplies database when the action identifier represents a command to add the supply identifier, or, removing the supply identifier from the supported-supplies database when the action identifier represents a command to remove the supply identifier, the supported-supplies database including supply identifiers corresponding to imaging supplies that are supported by the image forming apparatus.

11. An apparatus as defined in claim 5, wherein the supply identifier represents a second imaging supply different than the first imaging supply.

12. An article of manufacture of claim 10, wherein the supply identifier represents a second imaging supply different than the first imaging supply.

13. A method as defined in claim 1, wherein the command does not represent data associated with an amount of toner remaining in the first supply identifier and does not represent an authentication of the first imaging supply or the one or more imaging supplies.

14. A method as defined claim 1, further including providing access to the supported-supplies database to enable a user to identify the one or more imaging supplies that are supported by or compatible with the imaging forming apparatus.

15. A method as defined in claim 1, wherein the first supply identifier corresponds to one or more of an ink cartridge, a toner cartridge, a tank, or a container.

16. A method as defined in claim 1, wherein the one or more imaging supplies supported by or compatible with the image forming apparatus includes one or more of first imaging supplies associated with black or grey printing or second imaging supplies associated with color printing.

* * * * *

UNITED STATES PATENT AND TRADEMARK OFFICE

CERTIFICATE OF CORRECTION

PATENT NO. : 9,182,721 B2
APPLICATION NO. : 13/697997
DATED : November 10, 2015
INVENTOR(S) : Pei Shan Tay et al.

It is certified that error appears in the above-identified patent and that said Letters Patent is hereby corrected as shown below:

IN THE CLAIMS

In column 14, line 15, in Claim 14, delete "claim 1" and insert -- in claim 1 --, therefor.

Signed and Sealed this
Twenty-ninth Day of March, 2016

Michelle K. Lee

Michelle K. Lee
*Director of the United States Patent and Trademark Office*